United States Patent
Heller et al.

(10) Patent No.: US 9,462,073 B2
(45) Date of Patent: *Oct. 4, 2016

(54) REMOTE ACCESS OF MEDIA ITEMS

(71) Applicant: Apple Inc., Cupertino, CA (US)

(72) Inventors: David Heller, San Jose, CA (US); Thomas C. Mavrakakis, Atherton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/796,713

(22) Filed: Jul. 10, 2015

(65) Prior Publication Data

US 2016/0006831 A1 Jan. 7, 2016

Related U.S. Application Data

(63) Continuation of application No. 13/895,010, filed on May 15, 2013, now Pat. No. 9,112,921, which is a continuation of application No. 11/701,823, filed on Feb. 2, 2007, now Pat. No. 8,463,924.

(51) Int. Cl.
| | |
|---|---|
| *G06F 15/16* | (2006.01) |
| *H04N 7/16* | (2011.01) |
| *H04L 29/08* | (2006.01) |
| *G11B 27/10* | (2006.01) |
| *G11B 27/11* | (2006.01) |
| *G11B 27/32* | (2006.01) |
| *H04N 5/765* | (2006.01) |
| *H04N 21/414* | (2011.01) |

(Continued)

(52) U.S. Cl.
CPC ........... *H04L 67/2842* (2013.01); *G11B 27/10* (2013.01); *G11B 27/11* (2013.01); *G11B 27/329* (2013.01); *H04L 65/60* (2013.01); *H04L 67/1095* (2013.01); *H04N 5/765* (2013.01); *H04N 21/41407* (2013.01); *H04N 21/4331* (2013.01); *H04N 21/632* (2013.01); *H04L 67/1097* (2013.01); *H04L 67/2861* (2013.01)

(58) Field of Classification Search
CPC ............... H04L 67/08; H04L 67/1095; H04L 67/1097; H04L 67/2842; H04L 67/2861; G06F 12/0802; G06F 17/30067; G06F 17/30902
USPC ............................................. 709/217; 725/82
See application file for complete search history.

(56) References Cited

U.S. PATENT DOCUMENTS 5,710,922 A * 1/1998 Alley .......................... G06F 9/52
6,006,274 A * 12/1999 Hawkins ............... G06F 1/1626
707/999.008

(Continued)

FOREIGN PATENT DOCUMENTS

WO  2006127271  11/2006

*Primary Examiner* — Viet Vu
*Assistant Examiner* — Michael A Chambers
(74) *Attorney, Agent, or Firm* — Polsinelli LLP

(57) ABSTRACT

Methods and systems that facilitate the downloading of media items to a first network device from a second network device are disclosed. A plurality of media items are identified Media item metadata associated with the plurality of media items is obtained from the second network device and stored on the first network device. Media item content data associate with a first subset of the plurality of media items is obtained from the second network device and stored on the first network device. In this manner, only media item metadata associate with a second subset of the plurality of media items is stored on the first network device.

23 Claims, 13 Drawing Sheets

(51) Int. Cl.
*H04N 21/433* (2011.01)
*H04N 21/63* (2011.01)
*H04L 29/06* (2006.01)

(56) References Cited

U.S. PATENT DOCUMENTS

| | | |
|---|---|---|
| 6,078,961 A | 6/2000 | Mourad et al. |
| 6,124,854 A | 9/2000 | Sartain et al. |
| 6,295,541 B1* | 9/2001 | Bodnar ............ G06F 17/30353 |
| 6,385,596 B1 | 5/2002 | Wiser et al. |
| 6,669,564 B1* | 12/2003 | Young ................ A63F 13/10 463/42 |
| 6,693,612 B1* | 2/2004 | Matsumoto ......... G09G 3/3413 345/102 |
| 6,728,729 B1* | 4/2004 | Jawa ................. G06F 17/3002 |
| 6,980,652 B1 | 12/2005 | Braitberg et al. |
| 7,131,059 B2* | 10/2006 | Obrador ............ G06F 17/30056 707/E17.028 |
| 7,194,757 B1 | 3/2007 | Fish et al. |
| 7,409,205 B2* | 8/2008 | Mittal ................ H04H 60/12 174/254 |
| 7,526,433 B2* | 4/2009 | Yoshiaki ............. G06Q 30/016 705/304 |
| 7,528,868 B2 | 5/2009 | Perotti et al. |
| 7,549,025 B2 | 6/2009 | Cypher et al. |
| 7,646,962 B1* | 1/2010 | Ellis ................. G11B 27/105 386/248 |
| 7,650,423 B2 | 1/2010 | Carden |
| 7,686,215 B2* | 3/2010 | Jones ............... G06F 17/30899 235/375 |
| 7,725,489 B2 | 5/2010 | Al-Attas et al. |
| 7,797,204 B2* | 9/2010 | Balent ................ G06Q 10/087 705/26.8 |
| 7,974,714 B2* | 7/2011 | Hoffberg ........... G06K 9/00369 360/75 |
| 8,020,762 B2* | 9/2011 | Jones ............... G06F 17/30899 235/375 |
| 8,099,758 B2* | 1/2012 | Schaefer ........... G06F 17/30082 726/1 |
| 8,126,147 B2 | 2/2012 | Farley et al. |
| 8,245,924 B2* | 8/2012 | Jones ............... G06F 17/30899 235/375 |
| 8,356,317 B2* | 1/2013 | Errico ................ G06Q 10/10 725/109 |
| 8,646,687 B2 | 2/2014 | Jones et al. |
| 9,104,289 B2 | 8/2015 | Jones et al. |
| 2001/0013983 A1* | 8/2001 | Izawa ................ G11C 7/16 360/2 |
| 2002/0032019 A1* | 3/2002 | Marks ............... G06F 17/30017 455/414.1 |
| 2002/0046315 A1* | 4/2002 | Miller ............... G06F 9/4443 711/1 |
| 2002/0055934 A1* | 5/2002 | Lipscomb ......... G06F 17/30053 |
| 2003/0056222 A1* | 3/2003 | Iwata ................ G06Q 30/016 725/87 |
| 2004/0055446 A1* | 3/2004 | Robbin ............... G10H 1/0008 84/615 |
| 2004/0214642 A1* | 10/2004 | Beck ................. A63F 13/327 463/40 |
| 2004/0254883 A1* | 12/2004 | Kondrk .............. G06Q 20/04 705/51 |
| 2004/0258390 A1* | 12/2004 | Olson ................ H04N 5/76 386/231 |
| 2005/0066219 A1 | 3/2005 | Hoffman et al. |
| 2005/0089022 A1* | 4/2005 | Muhonen ........... H04N 21/6543 370/352 |
| 2005/0256596 A1* | 11/2005 | Kataoka ............. G11B 27/034 700/94 |
| 2006/0009199 A1* | 1/2006 | Mittal ................ H04H 60/12 455/414.1 |
| 2006/0069827 A1 | 3/2006 | Kelly |
| 2006/0072721 A1 | 4/2006 | Wisniewski |
| 2006/0155914 A1* | 7/2006 | Jobs ................. G06F 1/1616 711/100 |
| 2006/0160627 A1* | 7/2006 | Fujimori ............. A63F 13/08 463/43 |
| 2006/0190466 A1 | 8/2006 | Mortensen et al. |
| 2006/0200570 A1 | 9/2006 | Stirbu et al. |
| 2006/0248557 A1* | 11/2006 | Stark ................ H04N 21/4126 725/37 |
| 2006/0253782 A1* | 11/2006 | Stark ................ G06F 17/30053 715/727 |
| 2006/0253874 A1* | 11/2006 | Stark ................ G06F 3/038 725/62 |
| 2006/0259949 A1* | 11/2006 | Schaefer ............ G06F 17/30082 726/1 |
| 2007/0061759 A1* | 3/2007 | Klein ................ G06F 17/30746 715/853 |
| 2007/0093244 A1 | 4/2007 | Jain et al. |
| 2007/0118606 A1* | 5/2007 | Duncan ............. G06F 17/3002 709/217 |
| 2007/0124250 A1 | 5/2007 | Yamashima et al. |
| 2007/0162395 A1 | 7/2007 | Ben-Yaacov et al. |
| 2007/0180125 A1 | 8/2007 | Knowles et al. |
| 2007/0198632 A1 | 8/2007 | Peart et al. |
| 2007/0204003 A1* | 8/2007 | Abramson ........... H04L 67/02 709/217 |
| 2008/0016176 A1* | 1/2008 | Leitner ............... A63F 13/10 709/217 |
| 2008/0052741 A1 | 2/2008 | Dharmaji |
| 2008/0320396 A1 | 12/2008 | Mizrachi et al. |
| 2010/0174918 A1 | 7/2010 | Hoffman et al. |
| 2012/0022975 A1 | 1/2012 | L'Heureux et al. |
| 2012/0158875 A1 | 6/2012 | Almeida |
| 2012/0284422 A1 | 11/2012 | Jones et al. |
| 2015/0373090 A1 | 12/2015 | Jones et al. |

* cited by examiner

REMOTE ACCESS OF MEDIA ITEMS

CROSS-REFERENCE TO RELATED APPLICATIONS

This application is a continuation of U.S. patent application Ser. No. 13/895,010, filed on May 15, 2013, entitled "Remote Access of Media Items," which in turn is a continuation of U.S. patent application Ser. No. 11/701,823, filed Feb. 2, 2007, entitled "Remote Access of Media Items" both of which are hereby incorporated by reference herein.

BACKGROUND OF THE INVENTION

1. Field of the Invention

The present invention relates to the access of media items and, more particularly, to the remote access of media data associated with media items.

2. Description of the Related Art

Many users purchase media items such as songs or movies online and store them on a network device such as a personal computer. However, users often own and use multiple devices. For instance, many users own portable electronic devices that they use to play media items, which may be referred to as "media players."

A media player can store media items, such as audio tracks, that can be played or displayed on the media player. One example of a portable media player is the iPod® media player, which is available from Apple Computer, Inc. of Cupertino, Calif. Often, a media player acquires its media items from a host computer that enables a users to manage media their items. In managing media items, a user can create playlists for audio tracks. These playlists can be created at the host computer. Media items identified within the play lists can then be copied to the media player. More particularly, media items are typically downloaded from a host computer when the media player is physically connected to the host computer by way of cable (e.g., a USB cable).

Unfortunately, downloading media items from a host computer to a media player can be a time-consuming process. As a result, many users find themselves without the media items they would like on their portable devices.

In view of the above, it would be desirable if the desired media items could be accessed via an electronic device such as a portable electronic device without requiring the user to download all of the media items onto the electronic device when the media player is physically connected to the host computer.

SUMMARY OF THE INVENTION

The invention pertains to methods and systems that facilitate data delivery to electronic devices such as, for example, media players. In one embodiment, media item metadata associated with a plurality of media items can be obtained from a second network device and stored on a first network device. In addition, media item content data associated with a first subset of the plurality of media items can be obtained from the second network device and stored on the first network device. In this manner, media item metadata associated with a second subset of the plurality of media items can be stored on the first network device. The second subset of media items may be referred to as "virtual media items."

In accordance with another embodiment, information identifying the virtual media items can be displayed for selection by the user via the first network device. As a result, the user perceives that the virtual media items may be available on the first network device. In this manner, the virtual capacity of an electronic device may be increased.

In accordance with another embodiment, a graphical user interface can display a listing of a media library on an electronic device such as, for example, a mobile network device. The listing can include each of a plurality of media items in the media library. However, the electronic device may only store media content associated with a subset of the plurality of media items in the media library.

In accordance with yet another embodiment, one or both of the network devices can be a portable device such as a media player. Thus, media item content data associated with the virtual media items can be accessed and downloaded remotely. Similarly, a virtual media item can be played remotely.

In accordance with yet another embodiment, the electronic devices and network devices can be coupled to one another via a communications link that may use a network such as a wired or wireless local area network (LAN), wide area network (WAN), or a cellular network. In accordance with one embodiment, in order to enable the network devices to retrieve media item content data from one another, the network devices remain on and connected to the network. For instance, a personal computer can be turned on and connected to the Internet to enable a portable device to access the media items stored on the personal computer.

In accordance with yet another embodiment, when a media item is played, the corresponding media item content data can be deleted from the network device. Media item content data of another media item can then be retrieved and downloaded in the memory that has been released.

In accordance with another embodiment of the invention, it is possible that the media items that are available from the second network device can change over time. More particularly, a media item stored on the second network device can be deleted from the second network device. Similarly, a new media item can be stored on the second network device. The second network device can then send a notification to the first network device, where the notification indicates that a media item has been deleted from the second network device or stored on the second network device. The first network device can then store metadata associated with a newly added media item or delete metadata associated with a deleted media item (e.g., where the corresponding media item content data is not already stored locally).

In accordance with another embodiment, a computer-implemented method for managing a mobile media library on a mobile network device includes (a) determining whether the mobile network device has access to a media repository via a network; (b) determining whether the mobile media library is to be updated; (c) determining update data to be provided to the mobile media library; (d) acquiring the update data from the media repository via the network; and (e) storing the acquired update date to the mobile media library on the mobile network device, wherein the determining (c), acquiring (d) and storing (e) steps are performed when determining (a) determines that the mobile network device has access to the media repository and determining (b) determines that the mobile media library is to be updated.

Another embodiment of the invention pertains to the dynamic and/or automatic update of a mobile media library residing on a mobile device. The update to the mobile media library can be influenced by user configurations, preferences or settings. The update to the mobile media library can also be influenced by user history with respect to the mobile device. Still further, the dynamic update can be dependent on the availability of a network connection (wired or wireless). Still another implementation can operate to retain or remove media items differently based on their type. Still further, usage history, user ratings, policies or rules can be utilized to influence when and how updates to a mobile media library are performed.

According to another embodiment of the invention, updates to a mobile media library can be influenced by conditions of a mobile device. Since the update to the mobile media library involves the transmission of data to the mobile device, in one implementation, the transmission of the data, and thus the update to the mobile media library, can be paused or stopped in various conditions. For example, if the mobile device is a wireless communication device for its user, and if a wireless communication is incoming or present, then data transmission for the update to the mobile media library can be paused or stopped. In another implementation, if the network bandwidth currently available is deemed low, the amount or degree of update to the mobile media library being performed can be altered. For example, smaller and/or higher priority items can be transferred, while other larger or lower priority items can be deferred.

The invention can be implemented in numerous ways, including as a method, system, device, apparatus (including graphical user interface), or computer readable medium. Several embodiments of the invention are discussed below.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

There are a variety of types of media that can be delivered, downloaded and/or played. Generally, a media item can have associated therewith media item metadata and media item content data. Media item metadata can include information, such as a file name, URL, and/or other information, such as the size of the file containing the media item content data. Media item metadata may also include information that may be used to identify or organize the media items such as title, author, album name, album art, genre, history of use, media type, bit rate, sample rate, date modified, play count, last played, format, channels, ratings, rankings, public assessments, etc. The media item content data refers to the media data, which is typically stored in a media file.

Media item content data (i.e., media data) are digital data that can pertain to audio, video, and/or images that can be played. Some examples of specific forms of media data (which can be referred to as "media items") include, but are not limited to, songs, albums, audiobooks, playlists, movies, television shows, music videos, photos, computer games, audio and/or video clips or presentations, news reports, sports updates, and podcasts.

Various embodiments of the invention enable a user to access a plurality of media items via an electronic device, even where the media item content data for all of the media items is not stored on the network device. More particularly, by storing the media item metadata associated with the media items on the electronic device, it can appear to the user that the media item content data for all of the media items is stored on the electronic device, thereby increasing the "virtual capacity" of the electronic device. Upon selecting a media item for which only metadata is stored, the media item content data can be retrieved and played, as will be described in further detail below.

Exemplary embodiments of the invention are discussed below with reference to FIGS. 1A-11B. However, those skilled in the art will readily appreciate that the detailed description given herein with respect to these figures is for explanatory purposes as the invention extends beyond these limited embodiments.

Figure 1A:
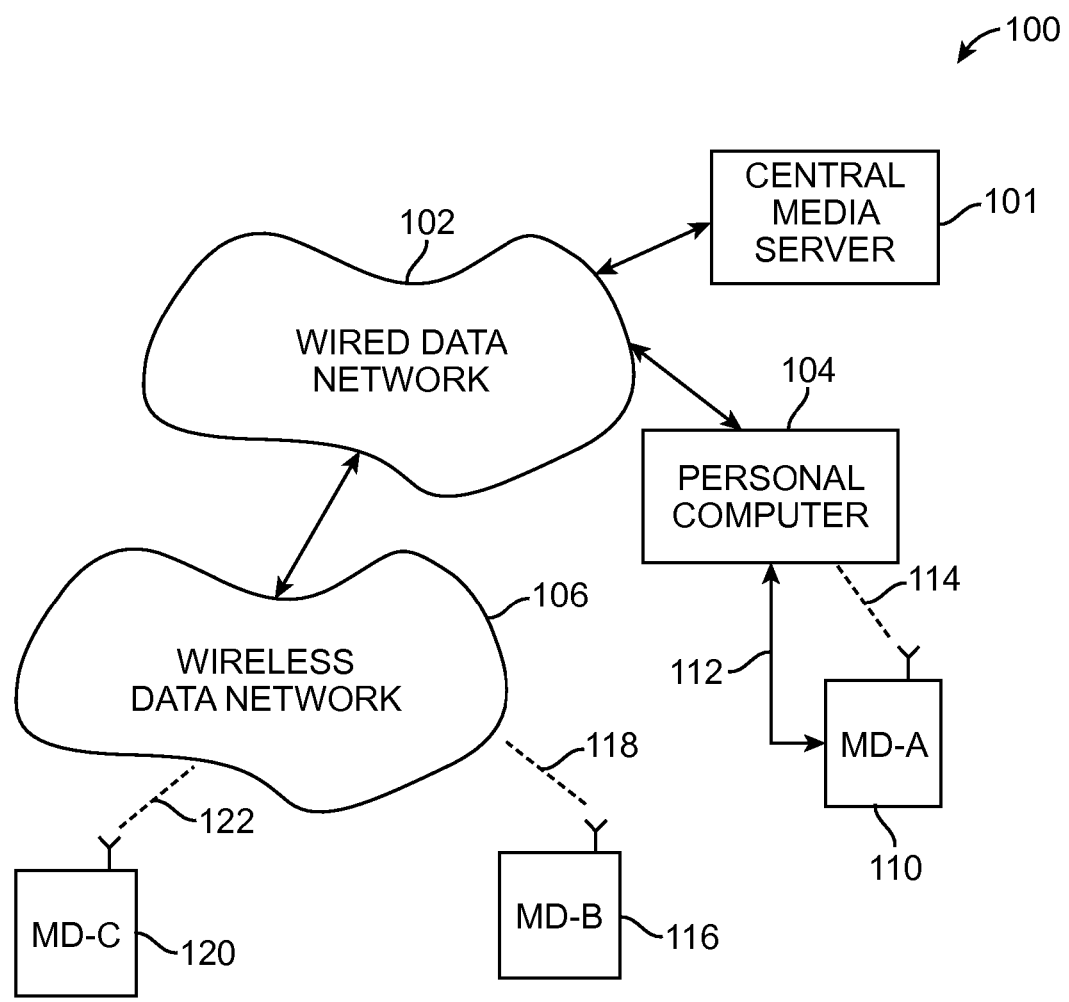
FIG. 1A is a block diagram illustrating a specific system in which embodiments of the invention can be implemented.

FIG. 1A is a block diagram illustrating exemplary system 100 in which embodiments of the invention can be implemented. Media exchange system 100 permits the transfer of data such as media item data (e.g., media item content data and media item metadata) between various different electronic devices. As set forth above, media item data can refer to media such as music, video, podcast episodes, TV shows, photos, games, and the like.

Media exchange system 100 facilitates exchange of data such as media item data between electronic devices using various wired and/or wireless communications links. The data exchange environment can pertain to exchange of media item data, in which case the data exchange environment can be considered a media exchange environment. At a minimum, the electronic devices are capable of receiving and storing digital data, and may also be capable of transferring digital data. Still further, these electronic devices can also process, display, present, play, or otherwise utilize digital data.

Media exchange system 100 can include central media server 101 and network 102 such as a wired data network. In this example, central media server 101 couples to wired data network 102. Wired data network 102 can be a global network, a wide area network, or a local area network. In one example, wired data network 102 pertains to some portion of the World Wide Web. A network device such as personal computer 104 can couple to network 102. Wireless data network 106 can also couple to wired data network 102. Wireless data network 106 can include one or more wireless data networks, such as cellular networks, WiFi networks, WiMAX networks, etc.

Central media server 101 stores or has access to numerous media items. In addition, media exchange system 100 supports one or more additional network devices such as portable media devices 110, 116 and 120. Portable media devices 110, 116 and 120 can communicate with personal computer 104 over wired link 112 or wireless link 114. As an example, wired link 112 can correspond to a cable (e.g., USB cable) that, if available, can interconnect portable media device 110 to personal computer 104. Wireless link 114 can be provided by a wireless capability, such as Bluetooth, infrared, etc. Typically, the portable media device 110 would be capable of communicating with personal computer 104 using either wired link 112, wireless link 114, or both.

Portable media device 116 can couple to the wireless data network 106 over a wireless link 118. Similarly, portable media device 120 can couple to wireless data network 106 over a wireless link 122. In this regard, portable media devices 116 and 120 can access central media server 101 via wireless data network 106. In addition, portable media devices 110, 116 and 120 can wireles sly access each other, thereby exchange media item data between portable media devices.

In one embodiment, one or more of the mobile devices, such as mobile devices 110, 116 or 120 illustrated in FIG. 1A, can pertain to media devices. More particularly, the media devices can pertain to media players, such as the iPod® media player from Apple Computer, Inc. These mobile devices can include a media management application that operates on the mobile device. One example of a media management application is iTunes®, available from Apple Computer, Inc. Given the portability of mobile devices, mobile devices are smaller and have less resources (e.g., storage capacity). Consequently, a media management application designed for use on a mobile device can offer less features and capabilities than would a counterpart media management application operating on a larger, more powerful computing device, e.g., a personal computer. Given that the mobile devices have wireless access to central media server 101, the mobile devices can interact with media server 101 to request and/or receive media item data (or other data). In this regard, a media management application operating on the mobile devices can communicate with the media server 101 to perform various tasks, including: navigating available media content at the server (such as navigation of a media store), receiving a periodic delivery of media content to media devices (such as a daily pushing of media item data from a server to a media device), etc.

According to another aspect of the invention, mobile devices (e.g., portable media devices) can communicate with one another. This type of communication can be referred to as peer-to-peer interaction. In this regard, one mobile device can communicate (e.g., unicast) directly with another mobile device. In another example, one mobile device can communicate (e.g., broadcast, anycast or multicast) to a plurality of other mobile devices.

In the peer-to-peer environment, one mobile device can communicate with one or more other electronic devices (whether mobile or stationary) in the immediate vicinity. Data sharing can be performed when such communication is available.

Data transfer could be between a mobile device and a computing device, such as a home computer or another mobile device. Typically, the mobile device and the computing device would be associated with a particular user. For example, when the mobile device is within range of a home computer (or a home network), data transfer can be performed between the mobile device and the home computer. Data transfer could also be between two or more mobile devices, or between two or more non-mobile devices. The data transfer can be automatic without any user action or can alternatively require manual approval by a user. The network devices can be associated with one another via an identification number or other suitable mechanism. In one embodiment, the data transfer can be part of a synchronization operation. For additional details on synchronization, particularly in a wireless manner, see e.g., U.S. application Ser. No. 10/987,649, filed Nov. 12, 2004, and entitled "WIRELESS SYNCHRONIZATION BETWEEN MEDIA PLAYER AND HOST DEVICE", which is hereby incorporated herein by reference.

Additional synchronization methods that may be used with this invention include, for example: (1) U.S. application Ser. No. 883,541, Publication No. US20060069809A1, entitled "State Based Synchronization" by Bertrand Serlet, filed Jan. 7, 2004; (2) U.S. application Ser. No. 10/853306, entitled "A Method of Synchronizing Between Three or More Devices" by Toby Paterson and Jerome Lebel, filed May 24, 2004; (3) U.S. application Ser. No. 10/852926, entitled "A Method of Synchronizing" by Toby Patterson and Jerome Lebel, filed May 24, 2004; (4) application Ser. No. 11/157,647, entitled "Apparatus And Method For Peer-To-Peer N-Way Synchronization In A Decentralized Environment," filed Jun. 21, 2005; (5) N-Way Synchronization of Data," by M. Scott Marcy and Brent Eric Knight, filed Jan. 8, 2007 and having Ser. No. 11/621,033; and (6) "Wide Area Peer-To-Peer Synching In A Decentralized Environment," by Bruce Nilo, Gordie Freedman, and Toby Paterson, filed Jan. 5, 2007 and having Ser. No. 11/620,618, which are incorporated herein by reference for all purposes. Additional information concerning wireless communication, media devices, content updates, synchronization and the like are provided in the following: (i) U.S. patent application Ser. No. 11/485,142, filed Jul. 11, 2006, and entitled "WIRELESS COMMUNICATION SYSTEM," which is hereby incorporated herein by reference; (ii) U.S. patent application Ser. No. 11/324,863, filed Jan. 3, 2006, and entitled "REMOTE CONTENT UPDATES FOR PORTABLE MEDIA DEVICES," which is hereby incorporated herein by reference; (iii) U.S. patent application Ser. No. 11/210,172, filed Aug. 22, 2005, and entitled "AUDIO SAMPLING AND ACQUISITION SYSTEM," which is hereby incorporated herein by reference; (iv) U.S. application Ser. No. 10/987,649, filed Nov. 12, 2004, and entitled "WIRELESS SYNCHRONIZATION BETWEEN MEDIA PLAYER AND HOST DEVICE," which is hereby incorporated herein by reference; and (v) U.S. application Ser. No. 10/423,490, filed Apr. 25, 2003, and entitled "MEDIA PLAYER SYSTEM," which is hereby incorporated herein by reference.

In the work environment or other network environment, as a user comes into an employer's office to work, the user's mobile device can transfer data to the user's work computer or to a network server for the office. The data transfer can be automatic without any user action or can alternatively require manual approval by a user. The user of the mobile device can also communicate with mobile devices of coworkers or other users of the network to exchange data. Methods and systems for supporting such communication are disclosed in (1) U.S. Application No. US2004000862115, Publication No. US20050273790A1, entitled "Networked Media Station," filed Jun. 4, 2004; (2) U.S. application Ser. No. 11/306,557, entitled "System and Method For Synchronizing Media Presentation At Multiple Recipients," by Bob Bradley and Robert Dale, filed Jan. 2, 2006; and (3) U.S. application Ser. No. 11/530,855, entitled "Network Media Device," By Jeff Robbin and Dave Heller, filed Sep. 11, 2006, which are incorporated herein by reference for all purposes. In some embodiments, authentication may be required before such exchange takes place. For example, the media item metadata may include additional information, which may be used to facilitate such authentication.

Additional information concerning communication among network devices, playlists and authentication are provided in: (1) U.S. Application No. US200500021313, U.S. Publication No. US20060155914A1, entitled "Highly Portable Media Device", by Steve Jobs, Anthony Fadell and Jonathan lye, filed Aug. 24, 2005; and (2) U.S. Application No. US200500021555, U.S. Publication No. US20060153040A1, entitled "Techniques For Improved Playlist Processing On Media Devices," which are incorporated herein by reference for all purposes.

A mobile device or non-mobile device capable of receiving, transmitting and/or storing data may be referred to as a "data device." The manner by which the data arrives at the data device can depend upon implementation. For example, the data can be directly transferred to the data device, or the data can be indirectly transferred to the data device. For example, the data transfer can be between one data device to another data device. Alternatively, one data device can cause another data device to transfer desired data to a recipient data device.

The shared data can be transferred to a recipient device by file transfer or streaming. The data transferred can be received by one or more data devices. Examples of data devices include a media player, PDA, a speaker unit, a wireless transmitter/receiver unit, etc. Users of data devices can also create and distribute content through data sharing. The streaming can be limited so as to restrict the number of data devices simultaneously receiving the data. On the other hand, if the users of the data devices are subscribers to the streaming content (i.e., have a subscription), then the streaming can be unlimited as to subscribers. Storing some portion of the media item content associated with the media item metadata may also be done to facilitate the streaming of media item content. For example, a user could begin playing such a previously stored portion of the media item content before streaming of the remaining content even begins.

Data can be shared after being purchased. For example, a recipient could purchase data from a remote server. The remote server would then cause the purchased data to be delivered to the recipient's data device. The purchase can be performed in real-time or can be deferred until a later point in time. Thereafter, the purchased data can be shared from the recipient's data device to another data device.

Regardless of the particular environment, the data transfer can be wireless. The wireless data transfer can be facilitated by a wireless network. One mobile device could wirelessly transmit data in a unicast fashion from one mobile device to another mobile device or stationary computing device. Still further, one mobile device could wirelessly transmit data in a multicast or broadcast fashion to a plurality of other mobile devices.

According to one aspect of the invention, a media device, such as a mobile device, can periodically receive updates from a media server. In one embodiment, when a media device such as a mobile device is within an available network that facilitates connection to the media server, the update can be performed. In one implementation, the update can be automatically performed.

Figure 1B:
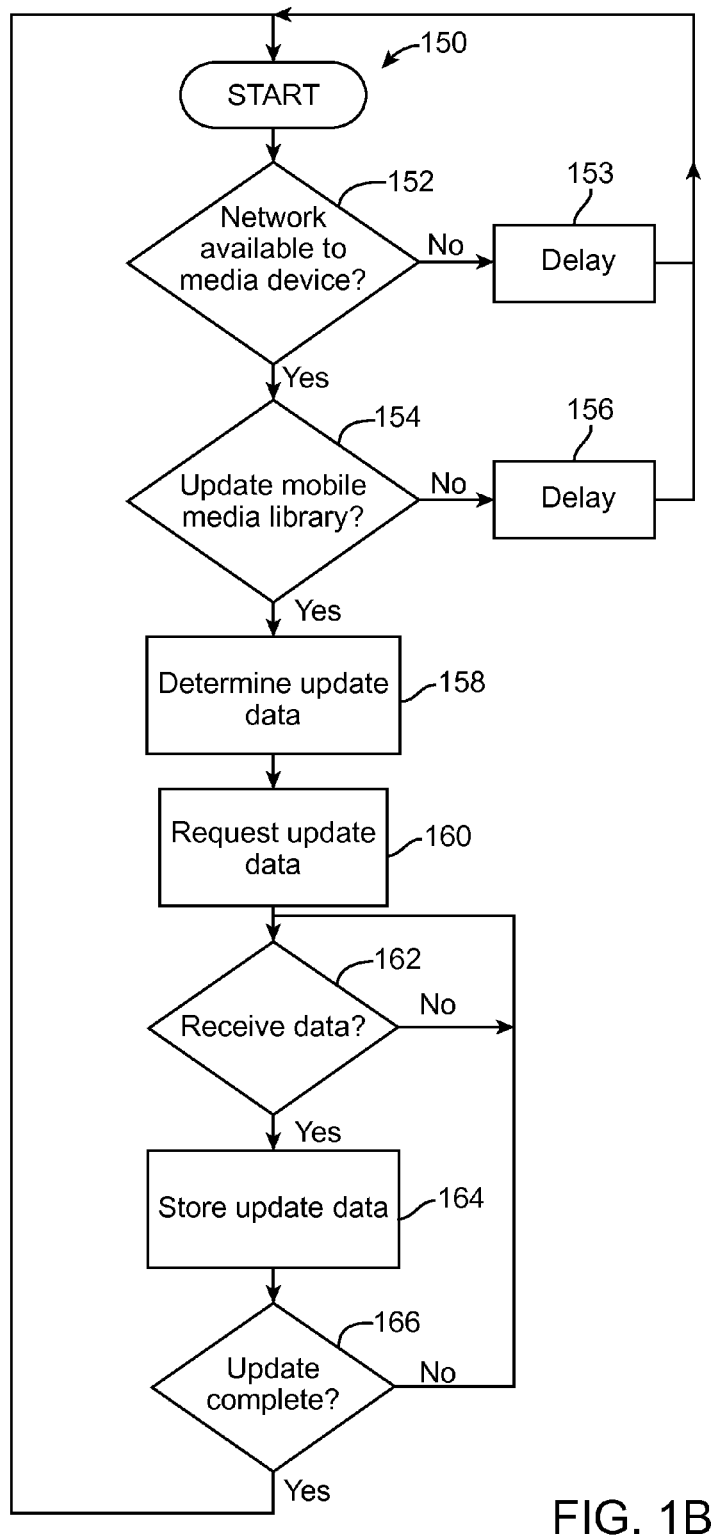
FIG. 1B is a process flow diagram illustrating a method of updating data stored in a media library in accordance with one embodiment of the invention.

FIG. 1B is a flow diagram of a media library update process 150 according to one embodiment of the invention. Media library update process 150 is, for example, performed by a media device, such as media device 110, 116 or 120 illustrated in FIG. 1. Media library update process 150 can begin with decision 152 that determines whether a network is available to the media device. The network can be a wired or wireless network that facilitates the media device in acquiring data communication with a media server. When decision 152 determines that the network is not available, a delay 153 can be imposed. Delay 153 serves to provide a delay before processing is again performed to determine whether a network is available. Following delay 153, media library update process 150 returns to repeat block 152.

On the other hand, when decision 152 determines that a network is available to a media device, decision 154 determines whether a mobile media library (MML) residing on the media device should be updated. Decision 154 can make use of one or more criteria in determining whether the mobile media library should be updated. The criteria can include policies, rules or conditions. When decision 154 determines that the mobile media library should not be updated, then delay 156 can be performed. Delay 156 serves to provide a delay before processing is again performed to determine whether an update to the mobile media library should be subsequently retried. Alternatively, when decision 154 determines that the mobile media library should be updated, update data can be determined at 158. Next, the update data can be requested 160. For example, the media device can send an update request to a media server to retrieve and return the update date to the media device via the network previously determined to be available: After update data has been requested at 160, decision 162 can determine whether the requested update data has been received. When decision 162 can determine that the requested update data have or have not been received, media library update process 150 can return to repeat decision 162 so as to await the requested update data. A time-out can be used to prevent waiting for an excessive period of time. When decision 162 determines that the requested update data is or has been received, the received update data can be stored 164 to the mobile media library. Thereafter, decision 166 can determine whether the update to the mobile media library is complete. For example, the update to the mobile media library can be deemed complete when the requested update data has been received and stored. When decision 166 determines that the update to the mobile media library is not complete, then media library update process 150 can return to repeat decision 162 so as to await receipt of the remaining portion of the requested update data. On the other hand, once decision 166 determines that the update to the mobile media library is complete, media library update process 150 returns to repeat decision 152 so that the media library can be subsequently updated in a similar manner. In this manner, a media library can be updated periodically and automatically, or as the network becomes available.

Figure 1C:
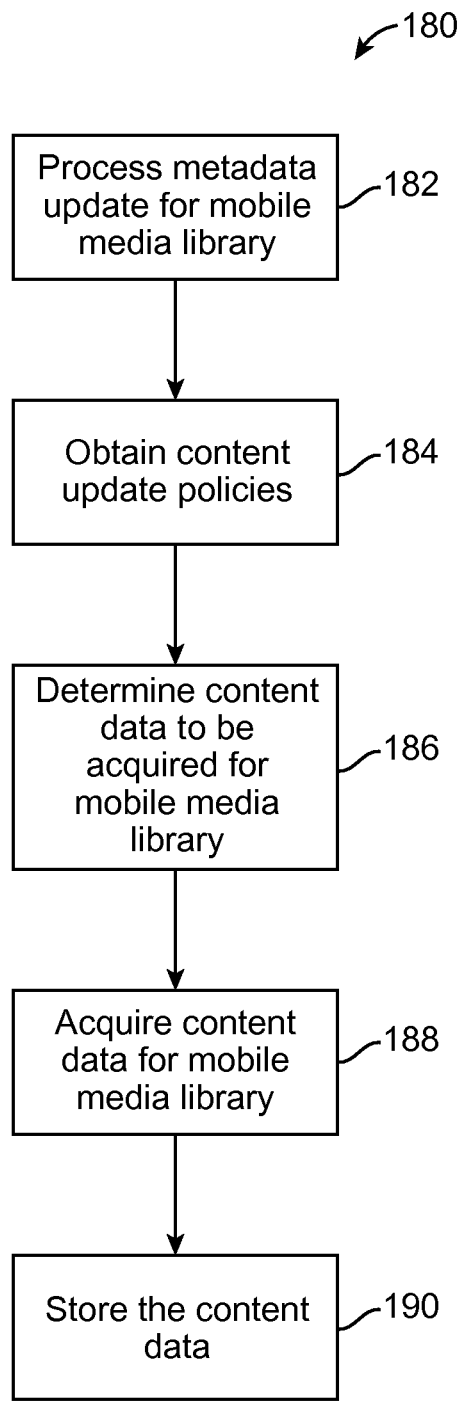
FIG. 1C is a process flow diagram illustrating a method of updating media content stored in a media library in accordance with one embodiment of the invention.

FIG. 1C is a flow diagram of mobile device content update process 300 according to one embodiment of the invention. Mobile device content update process 300 can, for example, be performed by a mobile device. Mobile device content update process 180 can initially receive 182 metadata updates for a mobile media library (MML) residing on the mobile device. For instance, the metadata updates can be received while the mobile device is physically connected to a media server, as well as when the mobile device has roamed to another location. Next, mobile device can obtain 184 content update policies. For example, the mobile device can store one or more update policies that govern when and how content updates are to be performed. The mobile device then determines 186 content data to be acquired for the mobile media library (e.g., using the content update policies). Thereafter, the mobile device operates to acquire 188 the content data for the mobile media library. In one embodiment, acquisition 188 of the content data involves a request by the mobile device to the mobile server for the content data, and then the return of the requested content data to the mobile device via a network. After the content data has been acquired 188 at the mobile device, the mobile device can store 190 the content data. Here, storage 190 of the content data can be within the mobile device. In one embodiment, content data is stored 190 within the mobile media library of the mobile device.

Figure 2:
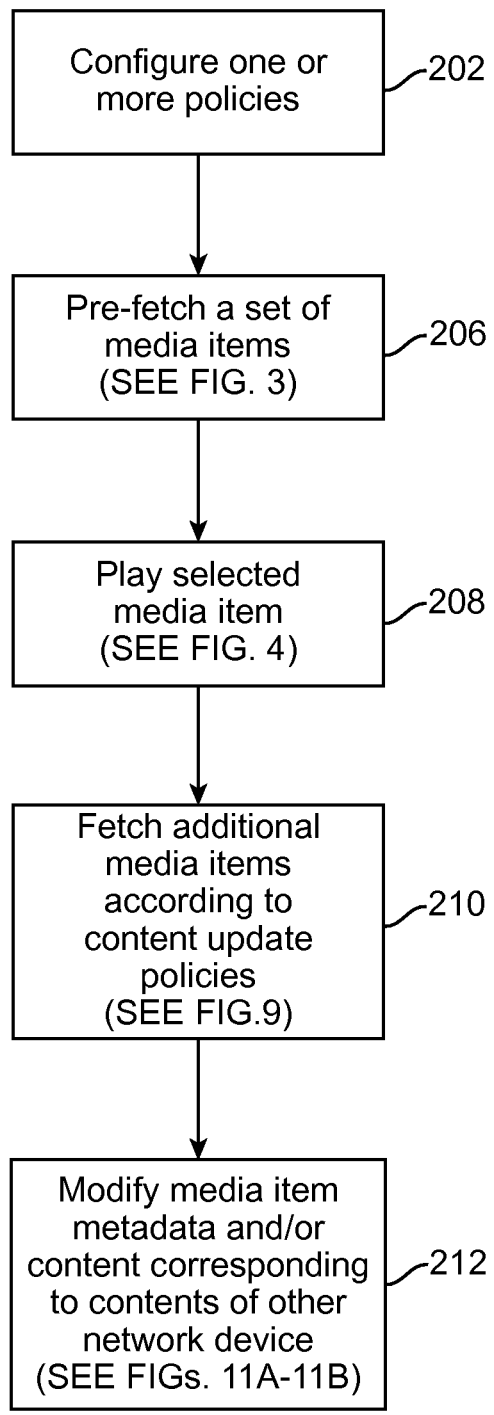
FIG. 2 is a general process flow diagram illustrating a specific method of implementing the present invention in accordance with one embodiment of the invention.

FIG. 2 is a general process flow diagram illustrating a specific method of implementing the present invention. One or more policies with respect to acquisition and retention of data for a media library can be configured at 202. More particularly, a particular policy can be hard-coded, configured (e.g., by a system administrator) or user-selected. These policies may be referred to as "content update" policies.

One aspect of the invention is that user preferences or settings can be utilized to configure operation of a device such as a mobile device with respect to acquisition and retention of data for a media library. For instance, one or more policies can be used to select media items to be obtained (e.g., pre-fetched) and/or to determine the order in which media items are downloaded (e.g., cached), as well as deleted. As one example, a policy can specify that the oldest media items are to be downloaded before newer media items. More particularly, a policy can be associated with a type of media. As another example, such a policy can be associated with television episodes based upon the assumption that the user would like to watch the episodes in chronological order. Similarly, a policy associated with movies can specify that the newest movies are to be downloaded before older movies, based upon the assumption that a user would rather watch newly released movies before older movies.

Content update policies can be implemented via various algorithms or processes. For instance, such algorithms or processes can include those that analyze the history of use of various media items. For example, such processes can analyze data for a particular period of time and/or for a specific type of media item. From the analysis, various decisions can be made.

A set of media items can be "pre-fetched" at 206. More particularly, media item metadata associated with a plurality of media items is obtained and stored, while media item content data associated with only a subset of the plurality of media items is stored. One method of pre-fetching media items will be described in further detail below with reference to FIG. 3.

Typically, a network device such as a mobile device can also play back the various media items within the media library (e.g., mobile media library). Thus, a user can choose to play a media item at 208. A method of playing a selected media item will be described in further detail below with reference to FIG. 4.

In some instances, it can be desirable to fetch additional media items according to various content update policies (e.g., where the network device has remaining unused memory) at 210. In this manner, the media items can be downloaded slowly as a background process. However, in other instances, it can be undesirable to perform downloading when other tasks are in process, as the downloading can slow other processes. For example, if the user is watching a television show or web-browsing, downloading can temporarily discontinue. One method of fetching additional media items will be described in further detail below with reference to FIG. 9. It can also be desirable to modify media item metadata and/or content stored on a network device corresponding to contents stored on another network device at 212. One method of performing such a modification will be described in further detail below with reference to FIGS. 11A-11B.

Figure 3:
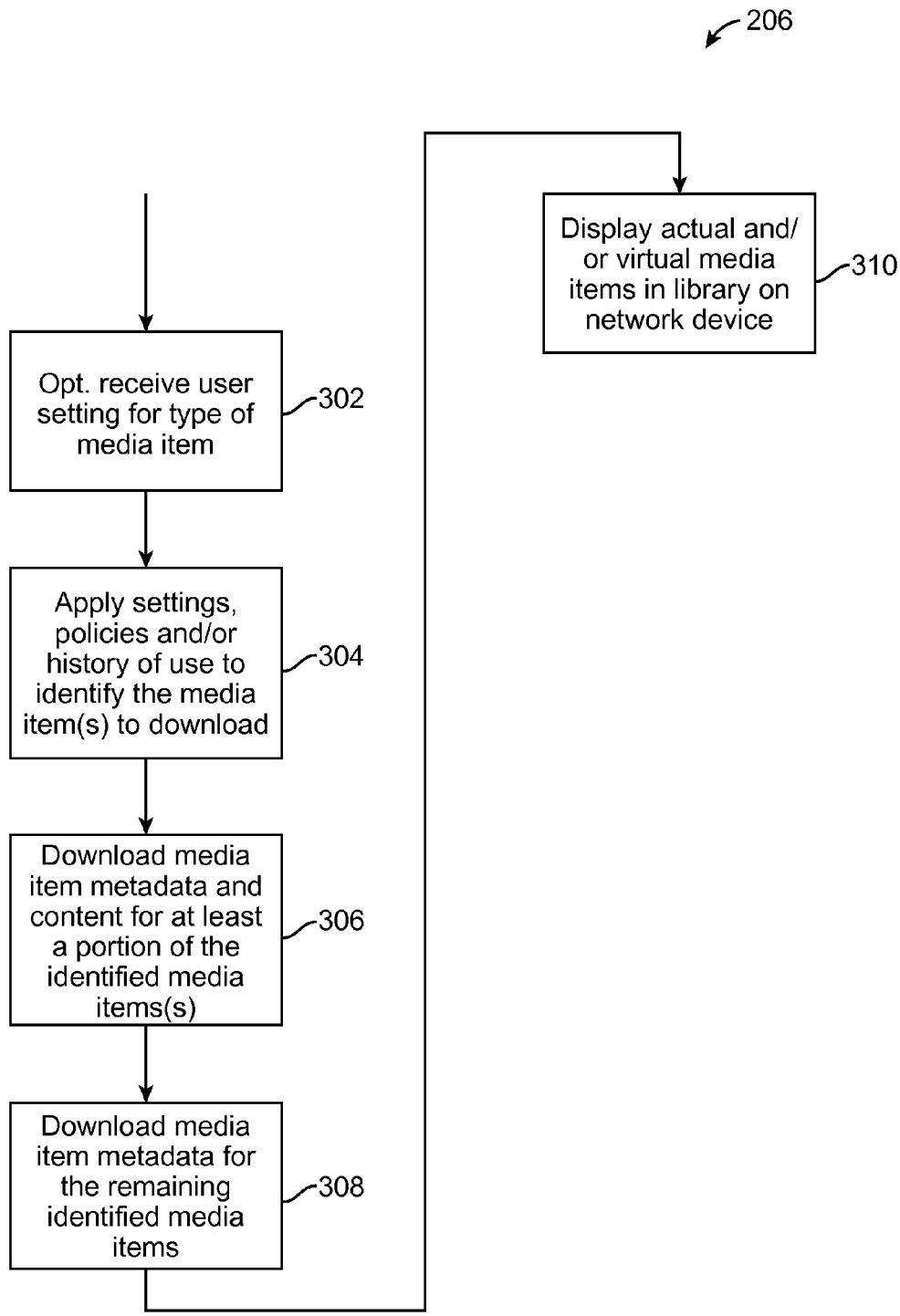
FIG. 3 is a process flow diagram illustrating a specific method of fetching media items in accordance with one embodiment of the invention.

FIG. 3 is a process flow diagram illustrating a specific method of fetching media items as shown at 206 of FIG. 2 in accordance with one embodiment of the invention. A plurality of media items to which access via the first network device is to be enabled can be directly or indirectly identified. This can be accomplished via one or more user settings at 302. More particularly, in order to select the media items to be "fetched," a user can establish a user setting associated with a particular type of media item. For instance, the type of media item can be a podcast episode, television episode, movie, or song. The user can choose all of the media items of that type. Alternatively, the user can choose a subset of the media items of that type. For instance, the user can choose media items having associated therewith a date (e.g., release date or date that the media item has been stored) that is after a specified date. As another example, the user can choose songs associated with the last three bands that have been played. In this manner, it is possible to identify the media item(s) of a particular media type to retrieve.

In addition to user-established settings, it is also possible to identify one or more policies and/or a history of use that can be used to identify a plurality of media items. Any settings, policies and/or history of use can therefore be applied at 304 to identify a plurality of media items to download to the first network device.

Since the memory on the first network device may not be able to accommodate all of the media items desired, media item metadata and media item content data for a portion (e.g., first subset) of the identified media items can be downloaded to the first network device at 306. More particularly, media item metadata and media item content data for the portion of the identified media items can be obtained from a second network device and stored on the first network device. In this case, only media item metadata for the remaining identified media items are downloaded to the first network device at 308. More particularly, only media item metadata for the remaining identified media items (e.g., second subset) are obtained from the second network device and stored on the first network device. In other words, media item content data for the remaining identified media items is not necessarily downloaded to the first network device. In accordance with one embodiment, step 308 can be performed when the first network device is physically connected to the second network device.

One aspect of the invention relates to a graphical user interface. For instance, the graphical user interface can be used by a user when interacting with a media library (e.g., mobile media library) residing on a network device, such as a mobile device. The graphical user interface can gain access to metadata stored within the mobile media library. In one embodiment, since the mobile media library may store most or all of the available metadata for the mobile media library, the graphical user interface can give the user the impression that the entire mobile media library is in existence on the mobile device. For instance, a list of all of the media items can be presented in a track listing area of the graphical user interface. However, typically, only a subset of the content data for the mobile media library is present on the mobile device. As noted above, the various conditions or operations of the mobile device can influence what subset of the content data is present on the mobile device at any given point in time. One mechanism for implementing a user interface is described in U.S. patent application Ser. No. 11/620,545, entitled "Adaptive Acceleration of Mouse Cursor," by Howard A. Miller and Frank Doepke, which is incorporated herein by reference for all purposes.

A list of the media items that are available to the user via the first network device (e.g., mobile device) can be presented in a graphical user interface via a display associated with the first network device at 310. Such a graphical user interface could assist a user of the device in interacting with the device. For example, the user interface could facilitate navigation of locally stored media as well as the access of remotely stored media. More particularly, it can be desirable to display the actual and/or virtual media items present on the first network device. As one example, only those media items for which media item content data is stored on the first network device are presented via the display. As another example, it can be desirable to present each of the plurality of media items via the display, enabling the user to select and play any of the media items. As a result, the user can perceive that all of the media items have been downloaded to the network device. Of course, it can be desirable to distinguish the media items for which media content has already been obtained from "virtual" media items for which only metadata has been obtained. For instance, the two sets of media items can be distinguished via highlighting or color distinctions. In accordance with one embodiment, the user can access a menu enabling the user to view all media items and/or only those media items that have been stored locally on the network device.

Figure 4:
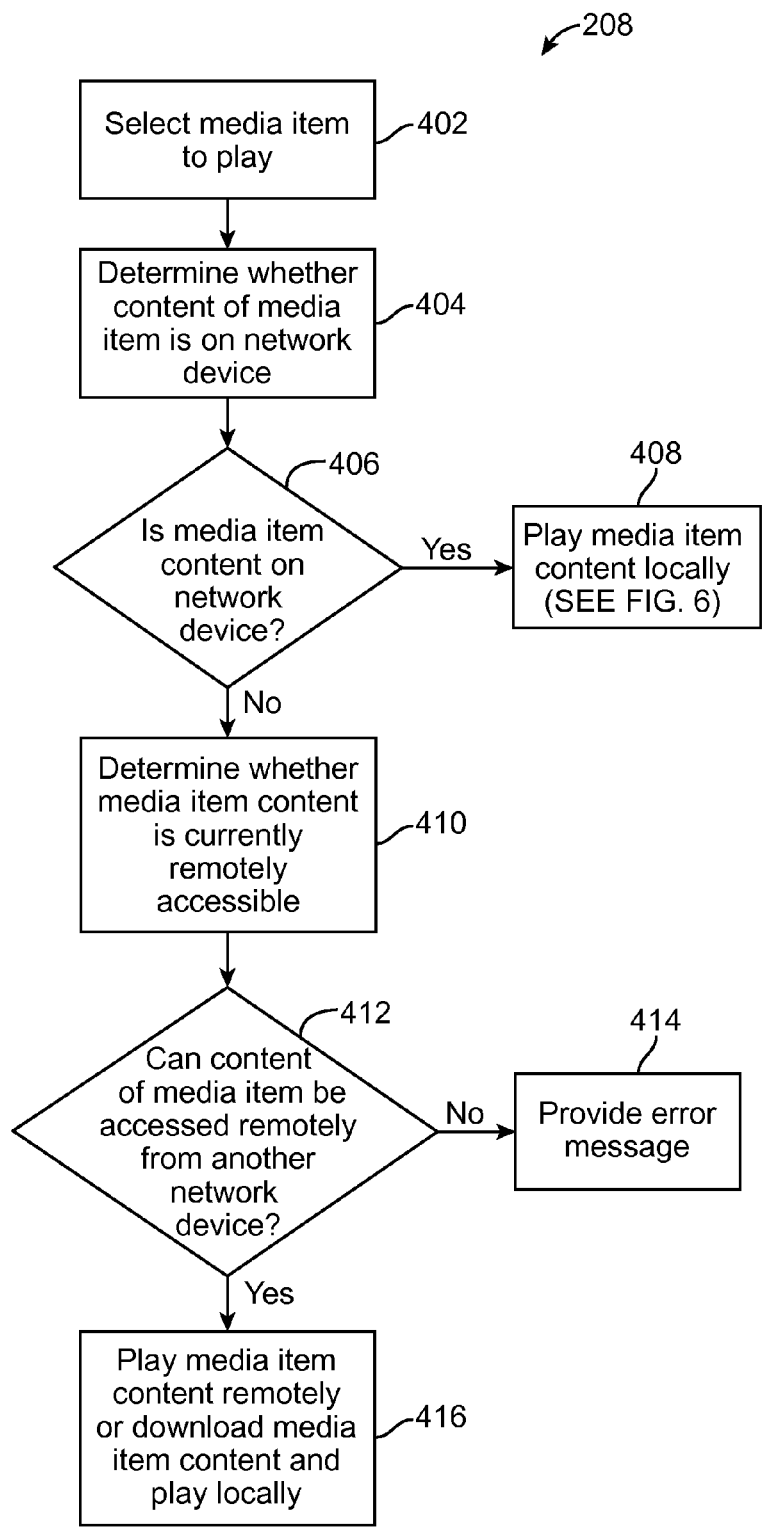
FIG. 4 is a process flow diagram illustrating a method of playing a media item via the first network device in accordance with one embodiment of the invention.

Once the first network device is disconnected from the second network device, the user can play a selected media item via the first network device. FIG. 4 is a process flow diagram illustrating a method of playing a media item via the first network device as shown at 208 of FIG. 2 in accordance with one embodiment of the invention. A user can select a media item to play at 402. However, the media item that has been selected may not be stored on the first network device. Thus, upon receiving a request to playa selected media item, it can be determined whether the media item content data associated with the selected media item is stored on the first network device at 404. If the media item content data associated with the selected media item is stored locally on the first network device at 406, the media item content data is played at 408. One method of playing media item content data locally will be described in further detail below with reference to FIG. 6.

If the media item content data associated with the selected media item is not present on the first network device at 406, it can be determined whether the media item content data is currently remotely accessible at 410. More particularly, it can be determined whether the media item content data can be accessed via the second network device. In some embodiments, it can be determined whether the media item content data can be accessed via another network device such as a server associated with an online media store. Thus, if the second network device cannot be accessed to retrieve the media item content data, it is possible to retrieve the media item content data from another network device. For instance, a song can be obtained from an online media store. Upon verification of the user's prior purchase history, the song can be provided free of charge. Alternatively, the user can be charged for a re-purchase of the song. Of course, it is possible that such a retrieval of media item content data can be supported by a service provided by a service provider. In this instance, the user can simply pay a monthly service fee for such media item content data retrieval service.

If the media item content data cannot be accessed remotely from another network device at 412, an error message can be provided to the user at 414 indicating that the selected item cannot be played at that time. However, if the media item content data is remotely accessible, the media item content data can be played remotely (e.g., via the second network device) or the media item content data can be downloaded from the second network device and played locally via the first network device at 416. One method of playing media item content data that is remotely accessible will be described in further detail below with reference to FIG. 5.

Figure 5:
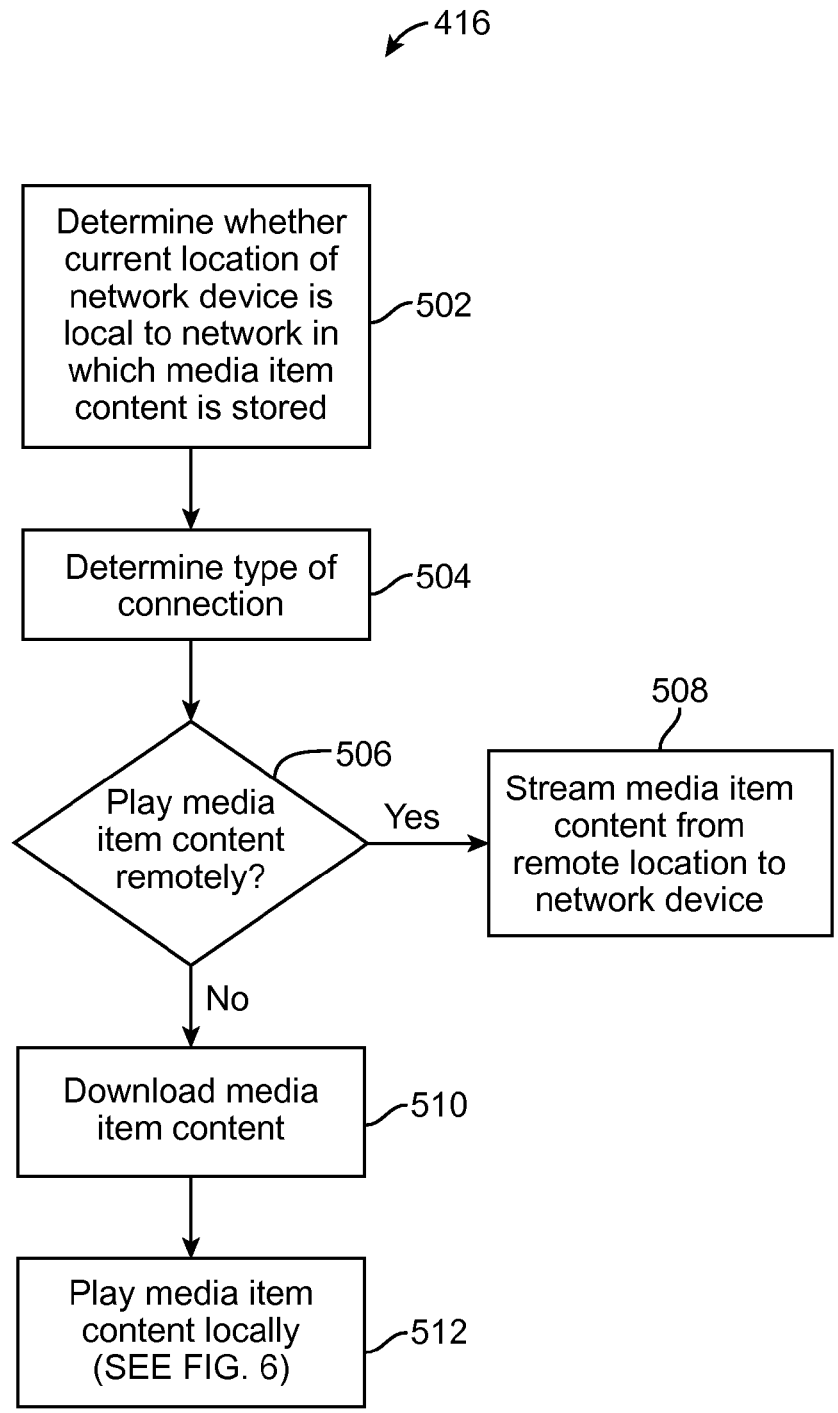
FIG. 5 is a process flow diagram illustrating a method of playing a selected media item in accordance with one embodiment.

FIG. 5 is a process flow diagram illustrating a method of playing a selected media item in accordance with one embodiment. As shown at 502, it can be determined whether the current location of the first network device is local to the network in which the media item is stored. For instance, the first network device can be a portable device that is no longer within the same network as the second network device on which the media item that has been requested is stored.

In accordance with one embodiment, the first network device is a mobile media device (e.g., portable media player). If a user decides to play a particular media item when in the presence of a wireless network that facilitates Internet connectivity, it can be determined whether a wireless network is available. In other words, it can be determined whether the mobile media device is in the presence of a wireless network such that the mobile media device can utilize the wireless network. Thus, it can be determined whether the mobile media device is within range of the second network device.

In addition, the type of connection via which the first network device is connected to the network and therefore the second network device (or online media store) can be ascertained at 504. For instance, the connection can be a network connection such as a connection to a wireless LAN, a telephone connection, cable connection, DSL connection, etc. Upon determining the type of connection, the bandwidth and/or speed of the network connection can be ascertained.

The location of the network device and/or the type of connection can be used to determine whether to play the media item content data remotely at 506. For instance, if the first network device is within the same network as the second network device on which the media item content data is stored and the connection provides sufficient bandwidth or speed, the media item can be played remotely via the second network device. More particularly, the media item content data can be streamed from the remote location to the first network device at 508.

However, if the first network device is no longer within the same network as the second network device and/or the connection does not provide sufficient bandwidth to play the media item content data remotely in real-time, the media item content data can be downloaded (e.g., retrieved from another network device and stored on the first network device) at 510 and the media item content data can be played locally via the first network device at 512.

Figure 6:
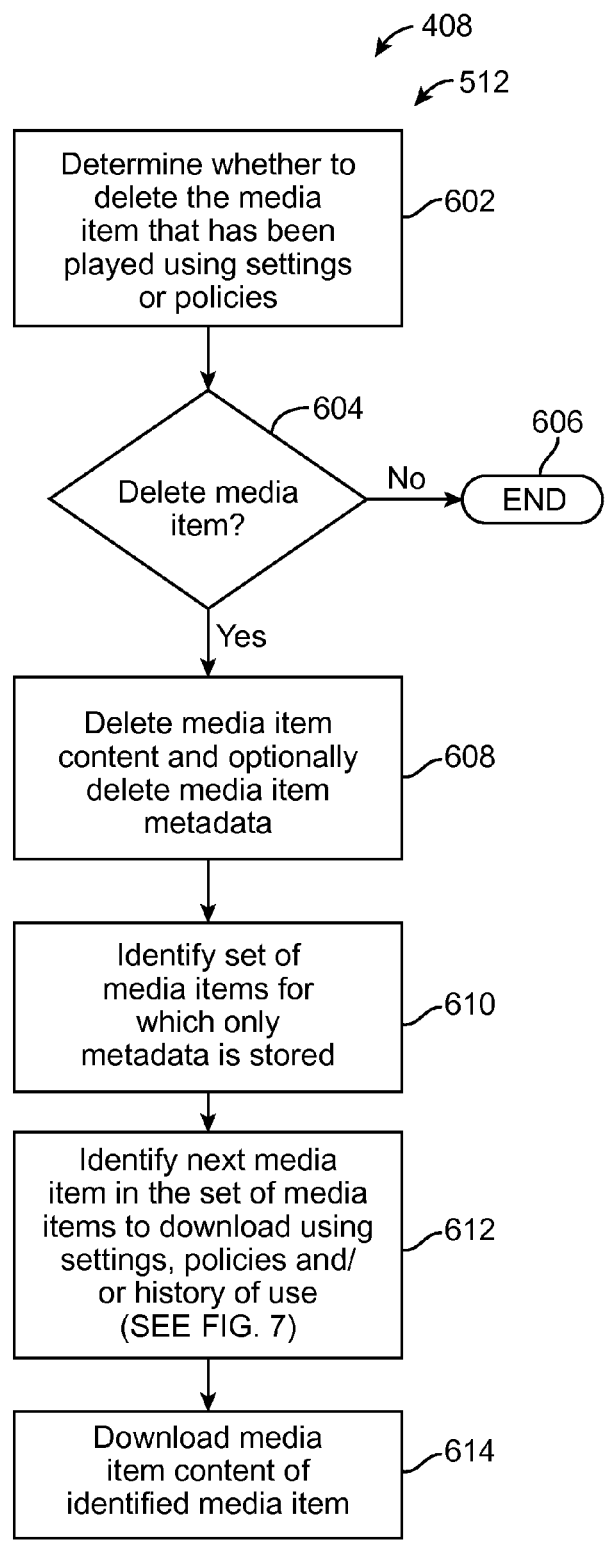
FIG. 6 is a process flow diagram illustrating a method of playing a selected media item locally as shown at 512 of FIG. 5 in accordance with one embodiment of the invention.

FIG. 6 is a process flow diagram illustrating a method of playing a selected media item locally as described above with reference to 512 of FIG. 5 in accordance with one embodiment of the invention. When a media item has been played locally, it can be desirable to delete the media item to make room for another media item. Thus, one or more settings and/or policies can be used to determine whether to delete the media item that has been played at 602. For instance, the user may have established via a setting that once a media item of a particular type has been played, the media item content data should be deleted (or should not be deleted). More particularly, a setting or policy can establish that when a movie has been played, the media item content data should be deleted. However, another setting or policy can establish that when a song has been played, the media item content data should not be deleted.

When it is determined that the media item should not be deleted at 604, the process can end at 606. However, if it is determined that the media item should be deleted, the process can continue at 608 to delete the media item content data. In addition, it may be desirable to delete the media item metadata.

Once a media item has been deleted, memory has been freed to retrieve one or more additional media items. As a result, the first network device now has memory to store the media item content data of another media item. Thus, a set of one or more media items for which only metadata is stored can be identified at 610. A next media item in the set of media items can be identified for downloading using one or more settings, policies and/or history of use at 612. One method of identifying the next media item to download will be described in further detail below with reference to FIG. 7. The media item content data of the identified media item can then be downloaded at 614. More particularly, the media item content data of the identified media item can be retrieved from another network device and stored on the first network device. The identified media item can be retrieved remotely where the first network device is not physically connected to the network device from which the identified media item is being retrieved.

Figure 7:
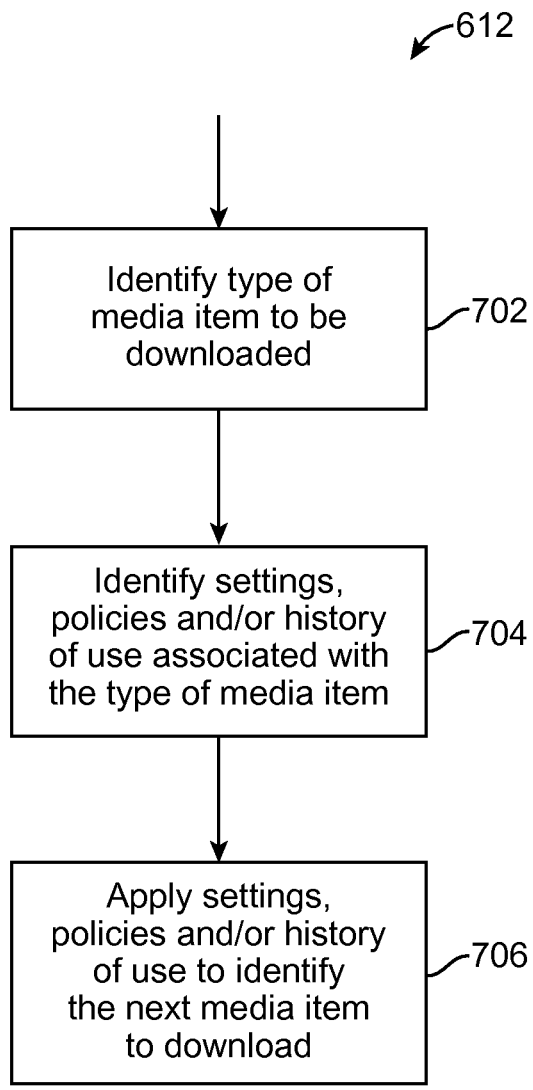
FIG. 7 is a process flow diagram illustrating a method of identifying the next media item to download as shown at 612 in accordance with one embodiment of the invention.

FIG. 7 is a process flow diagram illustrating a method of identifying the next media item to download as shown at 612 in accordance with one embodiment of the invention. The type of media item to be downloaded can be identified at 702. For instance, the type of the media item can be the same as the type of the media item for which the media item content data has recently been deleted. Thus, if an episode of a television show were deleted, the media item content data of another episode of a television show (e.g., the same show or a different show) can be downloaded. Similarly, if a song has been deleted, the media item content data of another song can be downloaded.

One or more settings, one or more policies, and/or history of use associated with the identified type of media item can be identified at 704. The identified setting(s), policies and/or history of use can then be applied to identify the next media item to download at 706. For instance, where a song has been deleted, it can be established that the user wants to listen to a song by the same musician as the song that has been deleted. As another example, the user may wish to watch the next television episode of the television show that has been deleted.

Figure 8:
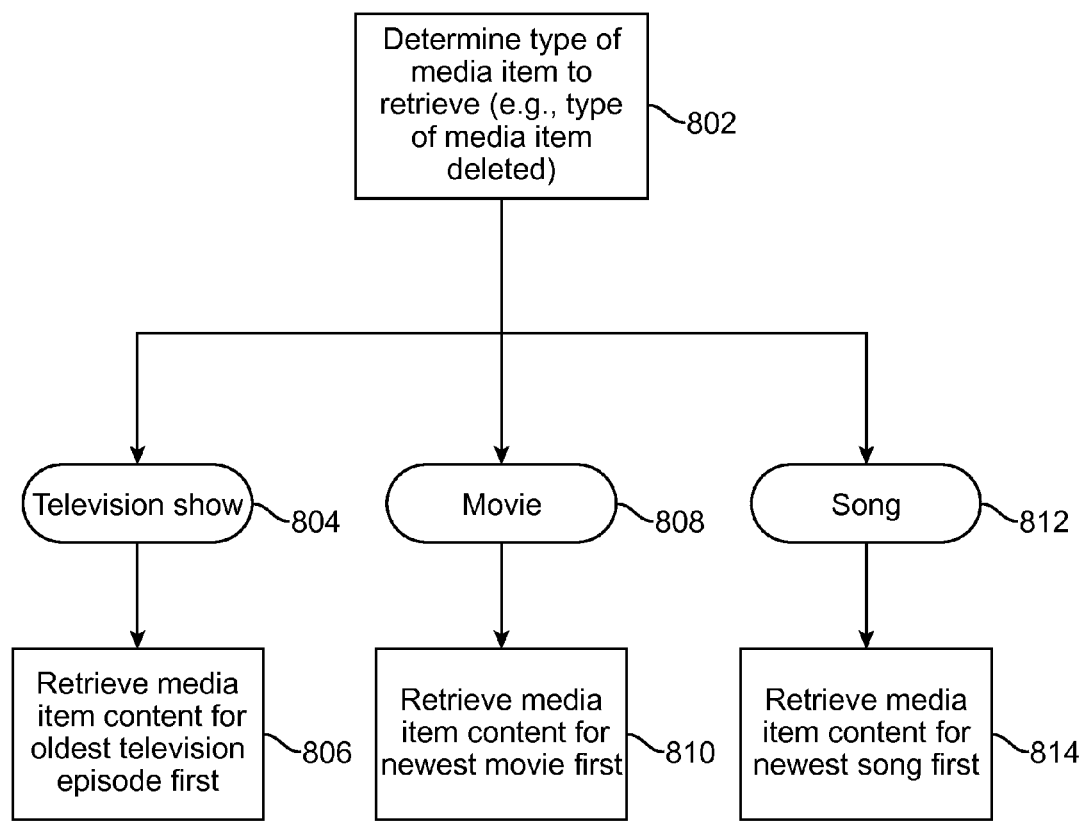
FIG. 8 is a process flow diagram illustrating an example of one implementation of the method of FIG. 7.

FIG. 8 is a process flow diagram illustrating an example of one implementation of the method of FIG. 7. As shown at 802, the type of media item to retrieve is ascertained (e.g., by identifying the type of the media item that has been deleted). Where the type of media item to retrieve is a television show at 804, the settings, policies and/or history of use can indicate that the media item content data for the oldest episode of the television show should be retrieved at 806. Similarly, where the type of media item to retrieve is a movie at 808, the settings, policies and/or history of use can indicate that the media item content data for the newest movie (e.g., the movie having the most recent release date) should be retrieved at 810. Where the type of media item to retrieve is a song at 812, the settings, policies and/or history of use can indicate that the media item content data for the newest song (e.g., the song having the most recent release date) should be retrieved at 814.

Figure 9:
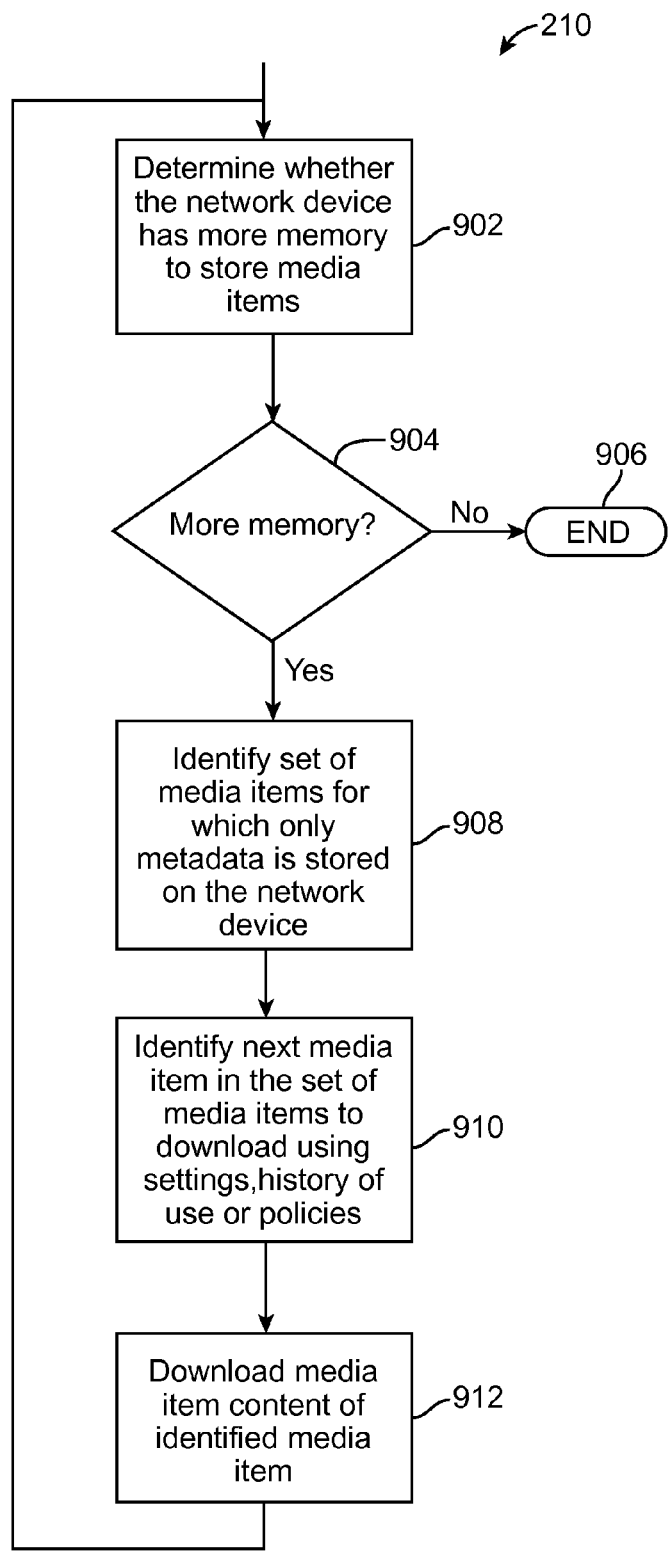
FIG. 9 is a process flow diagram illustrating a method of fetching additional media items where the network device has remaining unused memory as shown at 210 of FIG. 2.

FIG. 9 is a process flow diagram illustrating a method of fetching additional media items where the network device has remaining unused memory as shown at 210 of FIG. 2. It can be determined at 902 whether the network device has more memory to store media items at 902. If the network device does not have more unused memory at 904, the process can end at 906. However, if the network device has unused memory at 904, a set of media items for which only metadata is stored on the network device can be identified at 908. A next media item in the set of media items to be downloaded can be identified at 910 using one or more settings, one or more policies, and/or history of use. The media item content data of the identified media item can then be downloaded at 912. More particularly, the media item content data can be retrieved from another network device and stored.

Figure 10:
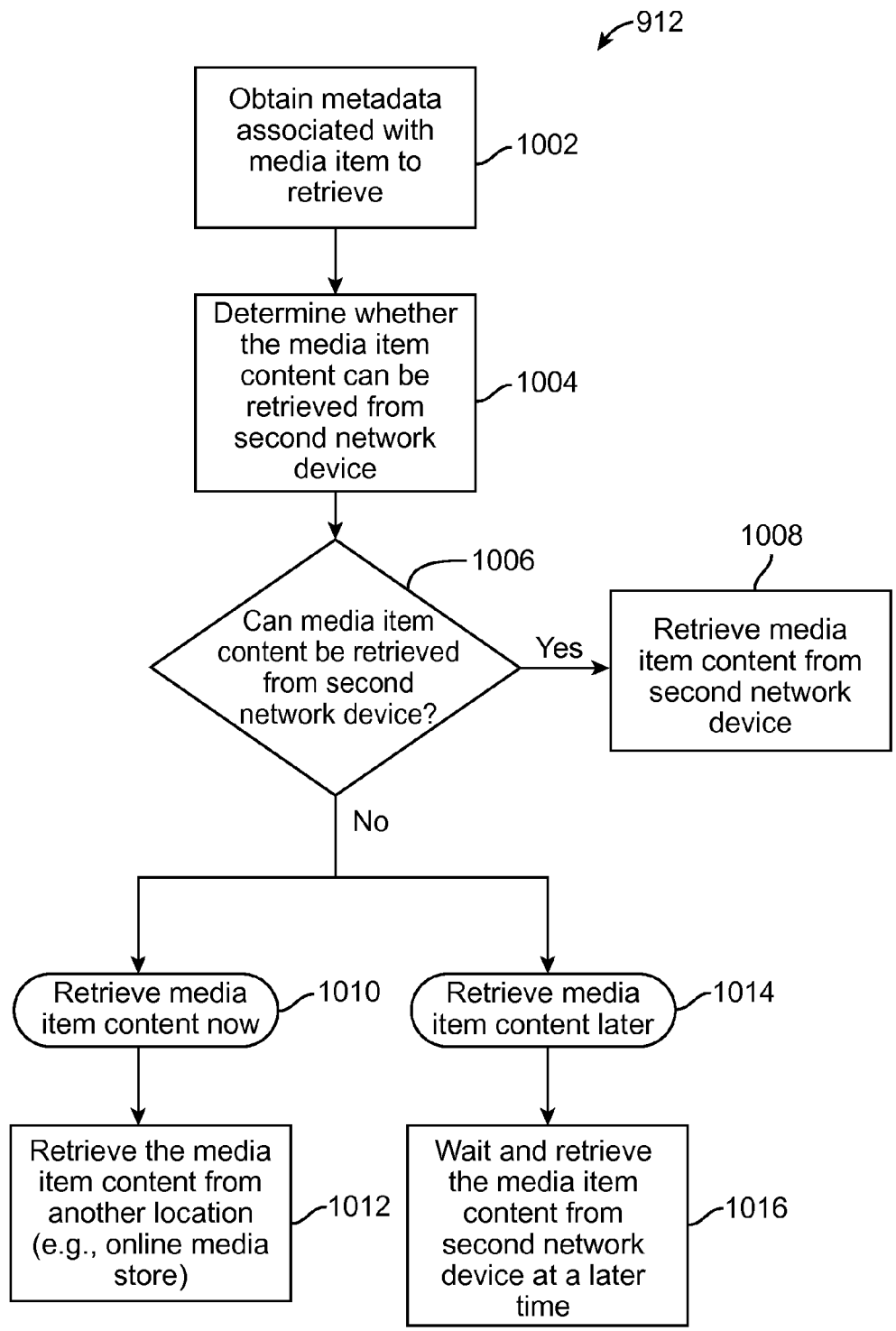
FIG. 10 is a process flow diagram illustrating a method of downloading media item content data as shown at 912 of FIG. 10.

FIG. 10 is a process flow diagram illustrating a method of downloading media item content data as shown at 912 of FIG. 10. Metadata associated with the media item for which media item content data is to be retrieved can be obtained at 1002. It can be determined whether the media item content data for the item identified by the metadata can be retrieved from the second network device at 1004. If the media item content data can be retrieved from the second network device at 1006, the media item content data can be retrieved from the second network device at 1008.

If the media item content data cannot be retrieved from the second network device at 1006, it is possible that the first network device (or the second network device from which the media item content data is being retrieved) has roamed to a location that cannot be accessed (e.g., where the two network devices are in two different networks). Thus, there are two possibilities for accessing the media item content data. The media item content data can be retrieved presently at 1010 from another location (e.g., network device), such as via an online media store at 1012. Alternatively, the media item content data can be retrieved later at 1014 by waiting to retrieve the media item content data from the second network device at a later time at 1016. For instance, when the first network device roams back into the network area of the second network device, the first network device can retrieve the media item content data from the second network device.

Even if the second network device can be accessed, it is still possible that the media item can no longer be retrieved from the second network device. For instance, the media item can have been deleted from the second network device. As a result, it may be impossible to download the media item content data from the second network device. Accordingly, it may be desirable to notify the first network device when modifications have been made to the media items that are stored on the second network device.

Figures 11A, 11B:
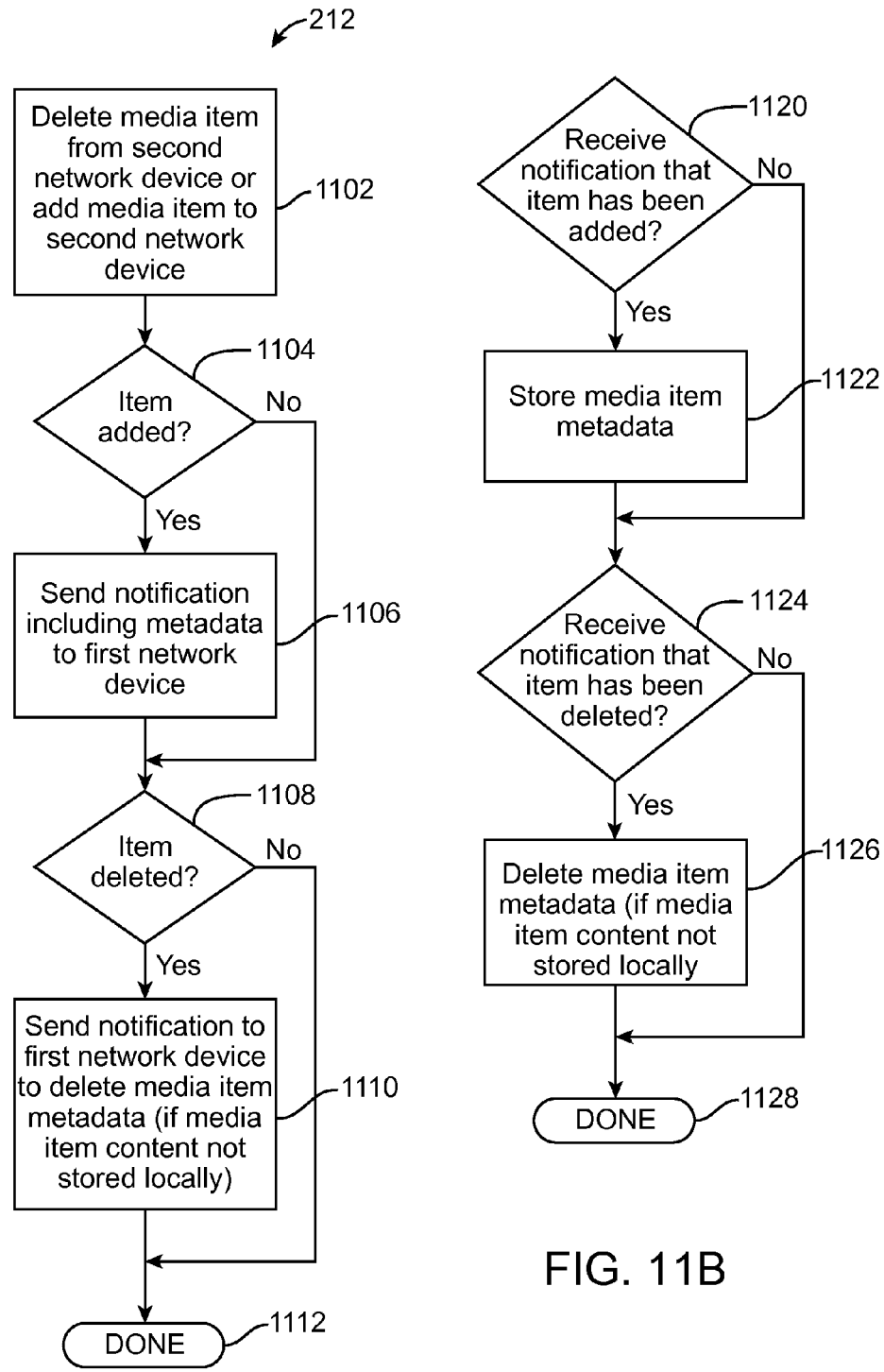
FIGS. 11A-11B together illustrate an illustrative method of modifying media item metadata and/or content stored on a network device corresponding to contents stored on another network device as shown at 212 of FIG. 2.

FIGS. 11A-11B together illustrate a method of modifying media item metadata and/or content stored on a network device corresponding to contents stored on another network device as set forth above with reference to 212 of FIG. 2. More particularly, FIG. 11A represents processes performed by the second network device, while FIG. 11B represents processes performed by the first network device.

It is possible to delete a media item from the second network device or add a media item to the second network device as shown at 1102. More particularly, when a new media item has been added to the second network device, media item content data and corresponding metadata are stored on the second network device. Similarly, when a media item has been deleted from the second network device, the media item content data and corresponding metadata can be deleted from the second network device.

If a new media item has been added to the second network device at 1104, it may be desirable to notify the first network device that the media item has been added to the second network device. This can be accomplished, for example, by sending the media item metadata to the first network device at 1106. If a media item has been deleted from the second network device at 1108, it may be desirable to notify the first network device that the media item has been deleted from the second network device. This can be accomplished by sending a notification to the first network device at 1110 to delete the corresponding metadata, thereby preventing the first network device from attempting to retrieve the corresponding media item content data from the second network device. Of course, if the first network device has already downloaded the media item content data, it may be undesirable to delete the corresponding metadata (or media item content data). As a result, the metadata can be deleted if the corresponding media item content data is not stored locally on the first network device. The process ends at 1112.

As shown in FIG. 11B, if the first network device receives notification from the second network device that a new media item has been downloaded at 1120, this notification can include the corresponding media item metadata. The first network device can then store this media item metadata at 1122. Similarly, if the first network device receives notification from the second network device that a media item has been deleted from the second network device at 1124, the corresponding media item metadata can be deleted from the first network device at 1126. As set forth above, if the corresponding media item content data has already been stored locally on the first network device, the media item metadata need not be deleted. However, if the media item content data for that media item has not yet been retrieved from the second network device, it may be desirable to delete the media item metadata from the first network device to prevent the first network device from attempting to retrieve the media item content data from the second network device. The process ends at 1128.

The various aspects, embodiments, implementations or features of the invention can be used separately or in any combination.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of various embodiments of the invention are numerous. Different aspects, embodiments or implementations can yield one or more of the following advantages. One advantage of the invention is that data, such as media item data, can be provided to (or from) a portable media device by way of a wired or wireless network, (e.g., a local wireless network). The wireless data exchange can be one-way or two-way.

The many features and advantages of the present invention are apparent from the written description. For instance, the embodiments and aspects described herein can be utilized separately or in any combination. Further, since numerous modifications and changes will readily occur to those skilled in the art, the invention should not be limited to the exact construction and operation as illustrated and described. Hence, all suitable modifications and equivalents can be resorted to as falling within the scope of the invention.

The invention claimed is:

1. A method, comprising:
   obtaining, by a client device from a network device, metadata associated with a plurality of episodic media items in a media item library, the metadata at least describing an order that the episodic media items are intended to be consumed;
   after playing an episode from the plurality of the episodic media items:
     determining, based on the order that the media items are intended to be consumed, that a next respective episode following the played episode is not available locally on the client device and is available from the network device;
     automatically requesting that the next respective episode in the order be pre-fetched from the media item library without receiving all other episodes in the plurality of episodic media items; and
     receiving the next respective episode.

2. The method of claim 1, wherein the receiving the next respective episode includes initiating streaming of the next respective episode.

3. The method of claim 1, wherein the receiving the next respective episode includes storing at least a portion of the next respective episode in a cache.

4. The method of claim 1, wherein obtaining metadata associated with a plurality of episodic media items in a media item library comprises obtaining release dates of the plurality of the episodic media items.

5. The method of claim 4, wherein the next respective episode following the played episode is an episode with the oldest release date following a release date of the played episode.

6. The method of claim 1, further comprising:
confirming that a user is authorized to access the plurality of the episodic media items on the client device.

7. The method of claim 1, further comprising:
enforcing a policy for automatically deleting the played episode after the played episode has been consumed.

8. The method of claim 1, further comprising:
after receiving at least a portion the next respective episode into a cache following the played episode, determining that the client device has remaining unused cache available; and
automatically requesting at least a portion of a further episode in the order.

9. The method of claim 1, wherein, before automatically requesting the next respective episode into a cache following the played episode, determining that the client device is connected with the network device via a connection having over a predetermined connection speed.

10. A non-transitory computer-readable medium storing instructions that, when executed by one or more computer processors of a computing device, cause the computing device to:
obtain, from a network device, metadata associated with a plurality of episodic media items in a media item library, the metadata at least describing an order that the episodic media items are intended to be consumed;
after playing an episode from the plurality of the episodic media items:
determine, based on the order that the media items are intended to be consumed, that a next respective episode following the played episode is not available locally on the computing device and is available from the network device;
automatically request that the next respective episode in the order be pre-fetched from the media item library without receiving all other episodes in the plurality of episodic media items; and
receive the next respective episode.

11. The non-transitory computer-readable medium of claim 10, wherein the instructions, when executed by one or more computer processors of a computing device, further cause the computing device to:
initiate streaming of the next respective episode.

12. The non-transitory computer-readable medium of claim 10, wherein the instructions, when executed by one or more computer processors of a computing device, further cause the computing device to:
store at least a portion of the next respective episode in a cache.

13. The non-transitory computer-readable medium of claim 10, wherein the instructions, when executed by one or more computer processors of a computing device, further cause the computing device to:
obtain release dates of the plurality of the episodic media items.

14. The non-transitory computer-readable medium of claim 13, wherein the next respective episode following the played episode is an episode with the oldest release date following a release date of the played episode.

15. The non-transitory computer-readable medium of claim 10, wherein the instructions, when executed by one or more computer processors of a computing device, further cause the computing device to:
confirm that a user is authorized to access the plurality of the episodic media items on the computing device.

16. The non-transitory computer-readable medium of claim 10, wherein the instructions, when executed by one or more computer processors of a computing device, further cause the computing device to:
enforce a policy for automatically deleting the played episode after the played episode has been consumed.

17. The non-transitory computer-readable medium of claim 10, wherein the instructions, when executed by one or more computer processors of a computing device, further cause the computing device to:
determine that the computing device has remaining unused cache available; and
automatically request at least a portion of a further episode in the order.

18. The non-transitory computer-readable medium of claim 10, wherein the instructions, when executed by one or more computer processors of a computing device, further cause the computing device to:
determine that the computing device is connected with the network device via a connection having over a predetermined connection speed before automatically requesting the next respective episode into a cache following the played episode.

19. A portable electronic device configured for obtaining media items from a network device comprising:
a processor being adapted to:
obtain metadata associated with a plurality of episodic media items in a media item library, the metadata at least describing an order that the episodic media items are intended to be consumed;
after playing an episode from the plurality of the episodic media items:
determine, based on the order that the media items are intended to be consumed, that a next respective episode following the played episode is not available locally on the portable electronic device and is available from the network device;
automatically request that the next respective episode in the order be pre-fetched from the media item library without receiving all other episodes in the plurality of episodic media items; and
receive the next respective episode.

20. The portable electronic device of claim 19, wherein the processor is further adapted to store at least a portion of the next respective episode in a cache.

21. The portable electronic device of claim 19, wherein the processor is further adapted to enforce a policy for automatically deleting the played episode after the played episode has been consumed.

22. The portable electronic device of claim 19, wherein the processor is further adapted to:
determine that the portable electronic device has remaining unused cache available; and
automatically request at least a portion of a further episode in the order.

23. The portable electronic device of claim 19, wherein the processor is further adapted to determine that the portable electronic device is connected with the network device via a connection having over a predetermined connection speed before automatically requesting the next respective episode into a cache following the played episode.

* * * * *